United States Patent [19]
Reuter et al.

[11] 3,868,393
[45] Feb. 25, 1975

[54] MANUFACTURE OF CARBOXYLIC ACIDS OF THEIR ANHYDRIDES

[75] Inventors: Peter Reuter, Bad Duerkheim; Wilhelm Friedrichsen, Ludwigshafen, both of Germany

[73] Assignee: Badische Anilin- & Soda-Fabrik Aktiengesellschaft, Ludwigshafen, Rhine, Germany

[22] Filed: Apr. 14, 1972

[21] Appl. No.: 244,228

[30] Foreign Application Priority Data
Apr. 19, 1971  Germany............................ 2118871

[52] U.S. Cl........ 260/346.4, 260/346.8 A, 260/687, 260/533 R, 260/523 R
[51] Int. Cl...................... C07c 63/18, C07c 57/14
[58] Field of Search...... 260/346.4, 246.8 A, 523 R, 260/533 R

[56] References Cited
UNITED STATES PATENTS
3,353,923  11/1967  Peters ................................... 23/288
3,464,930  9/1969  Friedrichsen et al. .............. 252/469

*Primary Examiner*—Henry R. Jiles
*Assistant Examiner*—Bernard I. Dentz
*Attorney, Agent, or Firm*—Johnston, Keil, Thompson & Shurtleff

[57] ABSTRACT

The manufacture of carboxylic acids or their anhydrides by catalytic oxidation of aromatic or unsaturated aliphatic hydrocarbons in tube reactors with fixed-bed catalysts containing vanadium pentoxide, the internal surface of the tubes of the reactor being completely or partially coated with a catalytic composition containing titanium dioxide and/or zirconium dioxide.

10 Claims, No Drawings

MANUFACTURE OF CARBOXYLIC ACIDS OF THEIR ANHYDRIDES

This invention relates to a process for the manufacture of carboxylic acids or their anhydrides by catalytic oxidation of aromatic or unsaturated aliphatic hydrocarbons in tube reactors in contact with fixed-bed catalysts containing vanadium pentoxide, the tubes of the reactor being coated with a catalytic composition.

It is known to manufacture carboxylic acids or their anhydrides such as phthalic and maleic anhydrides by catalytic oxidation of aromatic hydrocarbons such as benzene, o-xylene and naphthalene or of unsaturated aliphatic hydrocarbons such as butadiene, N-butene and mixtures containing butadiene and/or n-butene. In this process, which is achieved commercial significance particularly for the manufacture of phthalic anhydride and maleic anhydride, oxidation is advantageously carried out using air in the gas phase in contact with catalysts containing vanadium pentoxide at temperatures between 350° and 600°C in a tube reactor consisting of a bundle of tubes surrounded by a heat exhanger medium. In this continuous process a mixture of air and the hydrocarbon to be oxidized is passed through the catalyst-packed tubes while the outer surface of the tubes is maintained at the desired reaction temperature by means of the flowing heat exchanger medium, which may consist for example of a salt melt. The heat exchanger medium may be passed through the system in the same or opposite direction to the direction of flow of the reaction mixture through the tubes and, after leaving the reactor, gives up the excess heat which has been produced during the exothermic reaction.

The process may be carried out using all types of tube reactors in which the flow of heat exchanger medium is substantially laminar, i.e. non-turbulent. Particularly suitable reactors are those having annular channels disposed at the top and bottom around the periphery and through which the heat exchanger medium is centrally introduced and withdrawn. This type of reactor is described in detail in French Pat. No. 1,577,926.

In this process by-products are formed, examples of which are, for instance in the manufacture of phthalic anhydride, aldehydes and phtalide. Since these by-products impair the quality of the desired product even when present in small quantities, attempts have been made to prevent the formation of by-products by using higher temperatures, by employing catalysts of greater activity in assisting the desired conversion and by using longer residence time, e.g. by utilizing longer tube reactors. These measures are either too expensive or cause yield losses.

We have now found that these drawbacks may be obviated in a process for the manufacture of carboxylic acids or thier anhydrides by the oxidation of aromatic or unsaturated aliphatic hydrocarbons with oxygen or oxygen-containing gases in the presence of vanadium-pentoxide-containing fixed-bed catalysts at temperatures of from 350° to 600°C in the gas phase in a tube reactor by using tubes whose internal surface is completely or partially coated with a catalytic composition containing titanium dioxide and/or zirconium dioxide, preferably in admixture with less than 50 percent by weight (based on the total mixture) of vanadium pentoxide.

At least 50 percent of the total area of the internal surface of the tubes is coated with the catalytic composition in a thickness of from 0.01 to 0.5 mm. The catalytic composition contains titanium dioxide and/or zirconium dioxide and preferably up to 50 percent by weight (based on the total catalytic composition) of vanadium pentoxide. For example, the applied composition may be a mixture of from 50 to 98 percent and preferably from 80 to 98 percent by weight of titanium dioxide, which may be completely or partically replaced by zirconium dioxide, and from 50 to 2 percent and preferably from 20 to 2 percent by weight of vanadium pentoxide. This mixture may also contain small amounts, i.e. up to 15 percent by weight of the total catalytic composition, of other metal oxides such as oxides of chromium, molybdenum, tungsten, cerium, silver, niobium, cobalt, nickel, the lanthanides, and alkali or alkaline earth metals. The addition of phosphorus pentoxoide in an amount of from 0.1 to 20 percent by weight (calculated as phosphorus) of the total mixture has also proved very successful.

The composition of the catalytic coating applied to the inside of the tubes may vary within the stated limites at different points along the tube. For example, the first section of the tube, measuring, from the gas inlet end, from one third to one half of the total length of the tube, may be coated with a catalytic composition of the type stated containing, say, from 2 to 10 percent by weight of vanadium pentoxide, whilst the catalytic coating over the remainder of the tube may have a vanadium pentoxide content of, say, from 6 to 20 percent by weight.

It may also be convenient to apply the catalytic composition in different thicknesses in the same tube, for example in a thickness of from 0.01 to 0.03 mm over a length of from one third to one half of the total length of the tube as measured from the gas inlet end and a thickness of, say from 0.02 to 0.5 mm over the remainder of the tube.

Coating of the internal surfaces of the tubes with the catalytic composition may be carried out, for example, by spraying the said surfaces at from 200° to 500°C with, say, an aqueous suspension of the metal oxides, to which formamide may be advantageously added, or with aqueous solutions of the corresponding metal salts. Alternatively, a solution of a titanium compound such as titanium chloride or titanyl sulfate may be mixed with a precipitant such as an aqueous solution of ammonia, sodium hydroxide or dilute hydrochloric or sulfuric acid and the suspension poured into the mechanically agitated tube with the result that the internal surface is coated with the hydroxide. Drying and heating to temperatures of from 100° to 1,000°C thus readily produces a coating of titanium dioxide. Coatings of different thicknesses may be produced, for example, by repeating the coating process on that part of the tube which is to receive a thicker coating. Thinner coatings may be produced by lowering the spraying pressure of the catalytic composition.

According to a preferred embodiment of the invention, tubes are used whose internal surface is not coated over a length of from one third to one half of the total length of the tube as measured from the gas inlet end. We have found, surprisingly, that this greatly reduces the formation of by-products with the result that very pure process products are obtained.

It may also be an added advantage to use tubes whose internal surface has been roughened over part or all of its length. It is advantageous when the roughened portion extends over, say, only from one third to one half of the total length of the tube, only that portion of the tube which is nearest the gas inlet point being roughened.

Roughening of the tubes may be effected, for example, by attaching raised roughening elements such as metal rings or spirals or by melting metal powders onto the smooth internal surface of the tube. It is most advantageous, however, to provide the internal surface of the tube with depressions, for example by mechanical methods such as milling or tapping.

Particularly advantageous are tubes having an internal diamter of from 25 to 40 mm and provided with annular or spiral depressions on its internal surface, such depressions having a width of from 0.5 to 30 mm and a depth of from 0.2 to 1 mm.

This additional measure of using roughened tubes increases the catalytic action so that less catalyst is required than in prior art processes. Furthermore, shorter tubes can be used, a saving of from about 30 to 100 cm of tube length being achieved over conventional methods in which tubes having a length of about 2.8 meters are usually employed. The length of the tube can be shortened still further if the tube is connected to a shaft furnace. In a shorter tube furnace having a length of about 1.5 to 2 meters, the reaction proceeds substantially isothermically and it is conveniently carried to the point at which from about 1 to 20 percent of the hydrocarbons introduced is still unreacted. This unreacted portion is then reacted in the following shaft furnace by adiabatic reaction. The optimum residual content of hydrocarbon following the isothermic part of the reaction may be adjusted by varying the temperature of the salt bath. The total unit consisting of tube furnace and shaft furnace is more economical than a tube furnace alone, which would have to be considerably larger in order to give the same output. Using this arrangement, it is generally possible to effect the reaction with a smaller amount of catalyst than when using conventional tube furnaces, In addition to the saving in equipment, however, the product obtained is purer and the yields are usually higher.

The tubes are packed with conventional catalysts, of which the most suitable materials are vanadium compounds, which may be dissolved in a melt of ammonium thiocyanate or potassium pyrosulfate. They are advantageously used in the form of spheres having a diameter of from 4 to 12 mm. Particularly suitable are unsupported catalysts such as are described for example in German Pat. No. 1,443,452, or supported catalysts. For the manufacture of phthalic anhydride, it is advantageous to use a catalytic composition containing from 1 to 40 percent and in particular from 1 to 15 percent by weight of vanadium pentoxide and from 99 to 66 percent and in particular from 99 to 85 percent by weight of titanium dioxide in anatase form. A nonporous substrate is coated with this composition so as to give a supported catalyst having a content of from 0.05 to 3 percent by weight of vanadium pentoxide. Such a catalyst is described in detail in French Pat. No. 1,480,078. The catalytic composition may contain from 0.05 to 5 percent by weight of phosphorus. For the oxidation of unsaturated hydrocarbons, catalytic compositions consisting of anatase containing from 4 to 10 percent by weight of vanadium pentoxide and from 6 to 20 percent by weight of phosphorus have proved successful. In the combination of tube furnace, the ratio of vanadium pentoxide in the catalyst in the tube furnace to that in the catalyst in the shaft furnace may vary from 1:1 to 1:6. The catalyst in the shaft furnace may have a larger thickness of active composition or be present in smaller particle sizes than in the tube furnace.

Using our new process, which is suitable, for example, for the manufacture of phthalic anhydride from o-xylene or naphthalene, of maleic anhydride from benzene or $C_4$ olefins, of acetic acid from $C_4$ olefins, of pyromellitic anhydride from durene or other 1,2,4,5-tetraalkylbenzenes, of trimellitic anhydride from 1,2,4-trimethylbenzene of other 1,2,4-trialkylbenzenes or of naphthalic acid from acenaphthene, the desired products are obtained in great purity and high yields.

EXAMPLE 1

Calcined magnesium silicate spheres having a diameter of 7.6 mm are coated with 6 percent (based on the uncoated spheres) of an active composition consisting of 6 percent of vanadium pentoxide, 0.4 percent of phosphorus pentoxide and 93.6 percent of anatase, and the coated spheres are placed in a tube of mild steel having a length of 2.5 m and an internal diameter of 25 mm. The first third of the internal surface of the tube, as measured from the gas inlet end, is tapped so as to give an internal thread having a pitch of 1.8 mm and a groove depth of 0.5 mm. From a point 1 meter from the gas inlet end to the other end of the vertical tube the inside wall of the tube is coated with a catalytic composition. This coating was produced by heating the tube to 300°C and spraying its internal surface with a suspension of 26.1 g of vanadium oxalate, 336 g of water, 67 ml of formamide, 240 g of titanium dioxide and 1.66 g of 80 percent w/w phosphoric acid and subsequently heating the sprayed tube to 400°C to form the oxides. The composition of this coating is the same as that of the active portion of the supported catalyst described above. The thickness of the coating is 0.1 mm.

The tube is surrounded by a salt bath consisting of sodium nitrite and potassium nitrate and is maintained at 380°C. 5,100 l/hr of air and 204 g/hr of o-xylene are passed down through the tube. The hot spot in the upper, uncoated portion of the tube.

The yield of phthalic anhydride is 112 percent by weight based on pure o-xylene. The product contains only slight traces of phthalide.

EXAMPLE 2

945 g of a catalyst consisting of 84 percent by weight of anatase, 3.4 percent by weight of vanadium pentoxide and 12.6 percent by weight of phosphorus pentoxide is placed, in the form of extruded pellets having a diameter of 5 mm and a length of 5 mm, in a 3 m long tube of mild steel having an internal diameter of 25 mm to fill the tube to a level of 2 mm. The inside wall of the vertical tube is provided with a catalytic coating over its length from the gas inlet to the bottom of the tube. This coating was produced by heating the tube to 300°C and spraying its inside wall with a suspension of 200 ml of water, 2.86 g of vanadium oxalate, 8.7 g of 80 percent w/w phosphoric acid, 42 g of anatase and 14 g of formamide and then heating to 400°C to form the oxides. The composition of the resulting coating is the same as that of the catalyst comprising the tube packing. The thickness of the coating is 0.1 mm.

The tube is surrounded by a salt bath consisting of sodium nitrate and potassium nitrate and is maintained at 415°C. There is passed down the tube a mixture consisting of 2,000 l/hr of air (STP) and 64 g/hr of a crude $C_4$ cut, 67.5 percent by weight of which is $C_4$ olefins which are converted to maleic anhydride during the oxidation. Maleic anhydride is produced in a yield of 65.4 percent of theory.

If the reaction is carried out under identical conditions but using a tube whose inside wall is note coated with the catalytic composition, the yield of maleic anhydride is 56.5 percent of theory.

We claim:

1. In a process for the manufacture of a carboxylic acid or a carboxylic acid anhydride by the oxidation of an aromatic or an unsaturated aliphatic hydrocarbon with oxygen or air in the presence of a vanadium-pentoxide fixedbed catalyst at a temperature of from 350° to 600°C. in the gas phase in a tube reactor containing the fixed-bed catalyst, the improvement which comprises:

carrying out the gas phase oxidation in contact with a catalytic coating which covers at least one-half up to not more than two-thirds of the total area of the inside wall of the tube to a thickness of from 0.01 to 0.5 mm, so that from one-third to one-half of the total length of the tube, measured from the gas inlet end, is free of siad catalytic coating on the internal surface of the tube, said coating consisting essentially of at least one oxide selected from the class consisting of titanium dioxide and zirconium dioxide, in admixture with up to 50 percent by weight (based on the mixture) of vanadium pentoxide.

2. A process as claimed in claim 1 wherein said fixed-bed catalyst consists essentially of 1 to 40 percent by weight of vanadium pentoxide and 99 to 60 percent by weight of titanium dioxide in anatase form.

3. A process as claimed in claim 2 wherein said fixed-bed catalyst further contains from 0.05 to 5 percent by weight of phosphorous pentoxide, calculated as phosphorous.

4. A process as claimed in claim 2 wherein said catalytic coating further contains up to 15 percent by weight of another metal oxide selected from the class consisting of the oxides of chromium, molybdenum, tungsten, cerium, silver, niobium, cobalt, nickel, the lanthanides and the alkali or alkaline earth metals.

5. In a process for the manufacture of maleic anhydride by oxidation of benzene or $C_4$ olefins with oxygen or air in the presence of a fixed-bed catalyst consisting essentially of titanium dioxide in anatase form containing from 4 to 10 percent by weight of vanadium pentoxide and from 6 to 20 percent by weight of phosphorus, said oxidation being carried out at a temperature of from 350° to 600°C. in the gas phase and in a tube reactor containing the fixed-bed catalyst, the improvement which comprises:

carrying out the gas phase oxidation in contact with a catalytic coating which covers at least one-half up to not more than two-thirds or the total area of the inside wall of the tube to a thickness of from 0.01 to 0b 0.5 mm, so that from one-third to one-half of the total length of the tube, measured from the gas inlet end, is free of said catalytic coating on the internal surface of the tube, said coating consisting essentially of from 50 to 98 percent by weight of at least one oxide selected from the class consisting of titanium dioxide and zirconium dioxide in admixture with from 50 to 2 percent by weight (based on the mixture) of vanadium pentoxide.

6. A process as claimed in claim 5 wherein said catalytic coating further contains from 0.1 to 20 percent by weight of phosphorus and up to 15 percent by weight of another metal oxide selected from the class consisting of the oxides of chromium, molybdenum, tungsten, cerium, silver, niobium, cobalt, nickel, the lanthanides and the alkali or alkaline earth metals.

7. A process as claimed in claim 6 wherein said catalytic coating contains from 20 to 2 percent by weight (based on the mixture) of vanadium pentoxide.

8. In a process for the manufactue of phthalic anhydride by the oxidation of o-xylene or naphthalene with oxygen or air in the presence of a fixed-bed catalyst consisting essentially of a nonporous substrate which is coated with a catalytic composition of 1 to 40 percent by weight of vanadium pentoxide, 99 to 60 percent by weight of titanium dioxide in anatase form and up to 5 percent by weight of phosphorus, the fixed-bed catalyst having a content of from 0.05 to 3 percent by weight of vanadium pentoxide, said oxidation being carried out at a temperature of from 350° to 600°C. in the gas phase and in a tube reactor containing the fixed-bed catalyst, the improvement which comprises:

carrying out the gas phase oxidation in further contact with a catalytic coating which covers at least one-half up to not more than two-thirds or the total area of the inside wall of the tube to a thickness of from 0.01 to 0.5 mm, so that from one-third to one-half of the total length of the tube, measured from the gas inlet end, is free of said catalytic coating on the internal surface of the tube, said coating consisting essentially of from 50 to 98 percent by weight of at least one oxide selected from the class consisting of titanium dioxide and zirconium dioxide in admixture with from 50 to 2 percent by weight (based on the mixture) of vanadium pentoxide, it being possible for the catalytic coating also to contain up to 15 percent by weight of oxides of chromium, molybdenum, tungsten, cerium, silver, niobium, cobalt, nickel, the lanthanides, and alkali or alkaline earth metals, and 0.1 to 20 percent by weight of phosphorus.

9. A process as claimed in claim 8 wherein said catalytic coating further contains from 0.1 to 20 percent by weight of phosphorus and up to 15 percent by weight of another metal oxide selected from the class consisting of the oxides of chromium, molybdenum, tungsten, cerium, silver, niobium, cobalt, nickel, the lanthanides and the alkali or alkaline earth metals.

10. A process as claimed in claim 9 wherein said catalytic coating contains from 20 to 2 percent by weight (based on the mixture) of vanadium pentoxide.

* * * * *

UNITED STATES PATENT OFFICE
CERTIFICATE OF CORRECTION

PATENT NO. : 3,868,393
DATED : February 25, 1975
INVENTOR(S) : Peter Reuter, et al It is certified that error appears in the above-identified patent and that said Letters Patent are hereby corrected as shown below:

In Column 1, Line 33, delete "The" and substitute --This--

In Column 3, Line 54, delete "66 percent" and substitute --60 percent--

In Column 5 (Claim 1), Line 25, delete "siad"

and substitute --said--

In Column 5 (Claim 5), Line 59, delete "or" and substitute --of--

In Column 5 (Claim 5), Line 61, delete "Ob"

In Column 6 (Claim 8), Line 34, delete "or" and substitute --of--

Signed and Sealed this eighteenth Day of May 1976

[SEAL]

Attest:

RUTH C. MASON
Attesting Officer

C. MARSHALL DANN
Commissioner of Patents and Trademarks